(12) United States Patent
Nam et al.

(10) Patent No.: US 7,483,209 B2
(45) Date of Patent: Jan. 27, 2009

(54) PARALLAX BARRIER AND THREE DIMENSIONAL DISPLAY DEVICE USING THE SAME

(75) Inventors: Hui Nam, Suwon-si (KR); Jang-Doo Lee, Suwon-si (KR); Hyoung-Wook Jang, Suwon-si (KR); Beom-Shik Kim, Suwon-si (KR); Myoung-Seop Song, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 244 days.

(21) Appl. No.: 11/441,691

(22) Filed: May 26, 2006

(65) Prior Publication Data
US 2007/0019291 A1    Jan. 25, 2007

(30) Foreign Application Priority Data
Jun. 29, 2005    (KR) ...................... 10-2005-0056826

(51) Int. Cl.
*G02B 27/22*    (2006.01)
(52) U.S. Cl. ......................................... 359/464; 349/15
(58) Field of Classification Search ....................... None
See application file for complete search history.

(56) References Cited

U.S. PATENT DOCUMENTS

| | | | |
|---|---|---|---|
| 5,751,479 A | 5/1998 | Hamagishi et al. | |
| 6,392,690 B1 * | 5/2002 | Fujii et al. | 348/59 |
| 2005/0200781 A1 * | 9/2005 | Takatani | 349/122 |

FOREIGN PATENT DOCUMENTS

| | | |
|---|---|---|
| EP | 0 833 183 A1 | 4/1998 |
| GB | 2 405 542 A | 3/2005 |
| GB | 2 405 545 A | 3/2005 |
| JP | 8-163605 | 6/1996 |
| JP | 2003-161912 | 6/2003 |

OTHER PUBLICATIONS

Patent abstracts of Japan for publication No. 2003-161912; dated Jun. 6, 2003 in the name of Kazusane Matsumoto, et al.
European Search Report dated Feb. 8, 2007, for EP 06116111.3, in the name of Samsung SDI Co., Ltd.
Patent Abstracts of Japan, Publication No. 08-163605, dated Jun. 21, 1996, in the name of Takashi Ikeda.

* cited by examiner

*Primary Examiner*—Lee Fineman
(74) *Attorney, Agent, or Firm*—Christie, Parker & Hale, LLP

(57) ABSTRACT

A three dimensional display device includes an image display unit. The image display unit includes pixels having first subpixels corresponding to a left-eye image and second subpixels corresponding to a right-eye image. The three dimensional display device also includes a parallax barrier which is located proximately to the image display unit. The parallax barrier includes light interception portions and light transmission portions alternately and repeatedly arranged in a direction. The parallax barrier also includes color filters arranged between the light interception portions and the light transmission portions. The color filters control paths of lights from the pixels.

19 Claims, 7 Drawing Sheets

PARALLAX BARRIER AND THREE DIMENSIONAL DISPLAY DEVICE USING THE SAME

CROSS-REFERENCE TO RELATED APPLICATION

This application claims priority to and the benefit of Korean Patent Application No. 10-2005-0056826 filed in the Korean Intellectual Property Office on Jun. 29, 2005, the entire content of which is incorporated herein by reference.

BACKGROUND OF THE INVENTION

1. Field of the Invention

The present invention relates to a three dimensional display device, and in particular, to an autostereoscopy-type three dimensional display device using a parallax barrier.

2. Description of the Related Art

Generally, three dimensional display devices supply different views to the left and right eyes of a user such that the user can have the depth perception of the viewed images. The three dimensional display devices may be classified into a stereoscopic display device where the user should wear viewing aids, such as polarizing glasses, and an autostereoscopic display device where the user can see the desired three dimensional images without wearing such viewing aids.

A common autostereoscopic display utilizes an optical separation element (or optical isolation element), such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type of liquid crystal display, and in this case, it may be converted between a two dimensional mode and a three dimensional mode. Thus the parallax barrier can be applied to laptop computers or cellular phones easily.

Sets of red (r), green (g), and blue (b) sub-pixels are alternately and repeatedly arranged in the image display unit.

A left image signal or a right image signal is input into electrodes corresponding to the sub-pixels. Generally these image signals are alternately and repeatedly input thereto according to an array of the sub-pixels.

The parallax barrier includes stripe-shaped light interception portions and light transmission portions. The light transmission portions are arranged such that each of the light transmission portions corresponds to at least two of the pixels.

With the above structure, the right-eye image light beams emitted from the sub-pixels for the right eye are transmitted through the light transmission portions toward the right eye of the user while being intercepted by the light interception portions in the direction of the left eye of the user.

The left-eye image light beams emitted from the sub-pixels for the left eye are transmitted through the light transmission portions toward the left eye of the user while being intercepted by the light interception portions in the direction of the right eye of the user.

Accordingly, the left and right images respectively reach the left and right eyes so that the user can see the desired three dimensional images.

When the parallax barrier is formed with a liquid crystal shutter, the distance between the three dimensional display device and the user (view distance) should be maintained at about 300~400mm for the user to see the three dimensional images.

But when the three dimensional display device is adapted to small-sized devices such as cellular phones and personal digital assistants (PDAs), according to the characteristics of the small-sized devices the view distance may be increased.

Accordingly, the view distance should be reduced for the user to see the three dimensional images with small-sized devices. Thus, efforts to optimize the view distance by reducing the distance between the image display plane formed in the image display unit and image separation plane formed in the parallax barrier have been undertaken.

With one of these efforts, the view distance can be reduced by reducing the thickness of the glass substrates of the flat panel display device (i.e., a liquid crystal display device) and the liquid crystal shutter used as a parallax barrier.

But this method has some limitations due to the minimum thickness of the glass substrates and some problems in the manufacturing processes.

Meanwhile, other efforts to reduce the view distance have been made, such as separating the left-eye image and the right-eye image by pixel units, but not by sub-pixel units.

In this case, color dispersion may occur such that each of the light beams from red, green, and blue sub-pixels is not gathered in a certain position but is dispersed.

SUMMARY OF THE INVENTION

Exemplary embodiments of the present invention are directed to a three dimensional display device using a parallax barrier which makes it possible to reduce the view distance and reduce or minimize color dispersion.

In an exemplary embodiment of the present invention, a three dimensional display device is provided. The three dimensional display device includes an image display unit, which includes pixels having first sub-pixels corresponding to a left-eye image and second sub-pixels corresponding to a right-eye image. The three dimensional display device also includes a parallax barrier which is located proximately to the image display unit. The parallax barrier includes light interception portions and light transmission portions alternately and repeatedly arranged in a direction. The parallax barrier also includes color filters arranged between the light interception portions and the light transmission portions, and the color filters control paths of lights from the pixels.

The light transmission portions may be arranged such that each of the light transmission portions corresponds to at least two of the pixels.

The color filters may include a first color filter located at one side of one of the light transmission portions and a second color filter located at the other side of the one of the light transmission portions. The second color filter may have a different color from that of the first color filter.

Each of the pixels may have three sub-pixels, and the first and second color filters may respectively have colors corresponding to two of the three sub-pixels with the exception of one of the sub-pixels located at the center among the three sub-pixels.

The sub-pixels may include red, green, and blue sub-pixels arranged in the direction, and each of the first and second color filters may transmit either the red light or the blue light.

The parallax barrier may include first and second substrates facing each other, first and second electrodes located on inner surfaces of the first and second substrates, and a liquid crystal layer formed between the first and second substrates. The first electrode may be formed in the same pattern as the light interception portions, and the color filters may be arranged corresponding to both sides of a portion of the first electrode.

The parallax barrier may further include a pair of alignment layers covering the first and second electrodes, first and second polarizing plates attached to outer surfaces of the first and second substrates, and an overcoat layer covering the color filters.

The color filters may contact the first substrate at an inner surface of the first substrate, and may be separated from the first electrode and the alignment layer by the overcoat layer.

The parallax barrier may also include a transparent plate and an opaque layer arranged on a surface of the transparent layer, and the opaque layer may be formed in the same pattern as the light interception portions. The color filters may be arranged corresponding to both sides of a portion of the opaque layer.

In another exemplary embodiment according to the present invention, a method of providing a three dimensional image is provided. A right-eye image and a left-eye image are displayed on an image display unit having a plurality of sub-pixels. The right-eye image is displayed on first said sub-pixels and the left-eye image is displayed on second said sub-pixels. Lights corresponding to the right-eye image is directed toward a right eye of a user using a parallax barrier having a plurality of alternately and, repeatedly arranged light interception portions and light transmission portions. Lights corresponding to the left-eye image is directed toward a left eye of the user using the parallax barrier. The lights are color filtered at peripheral edges of each of the light transmission portions, such that only a first color light is transmitted at one of the peripheral edges and only a second color light is transmitted at another one of the peripheral edges.

The exemplary embodiments of the present invention can reduce the view distance, and it can be adapted to small-sized devices. In addition, the exemplary embodiments of the present invention improve quality of the three dimensional images and freedom of movement of the user by reducing or minimizing color dispersion.

DETAILED DESCRIPTION

The present invention will be described more fully hereinafter with reference to the accompanying drawings, in which certain exemplary embodiments of the present invention are shown.

Figure 1:
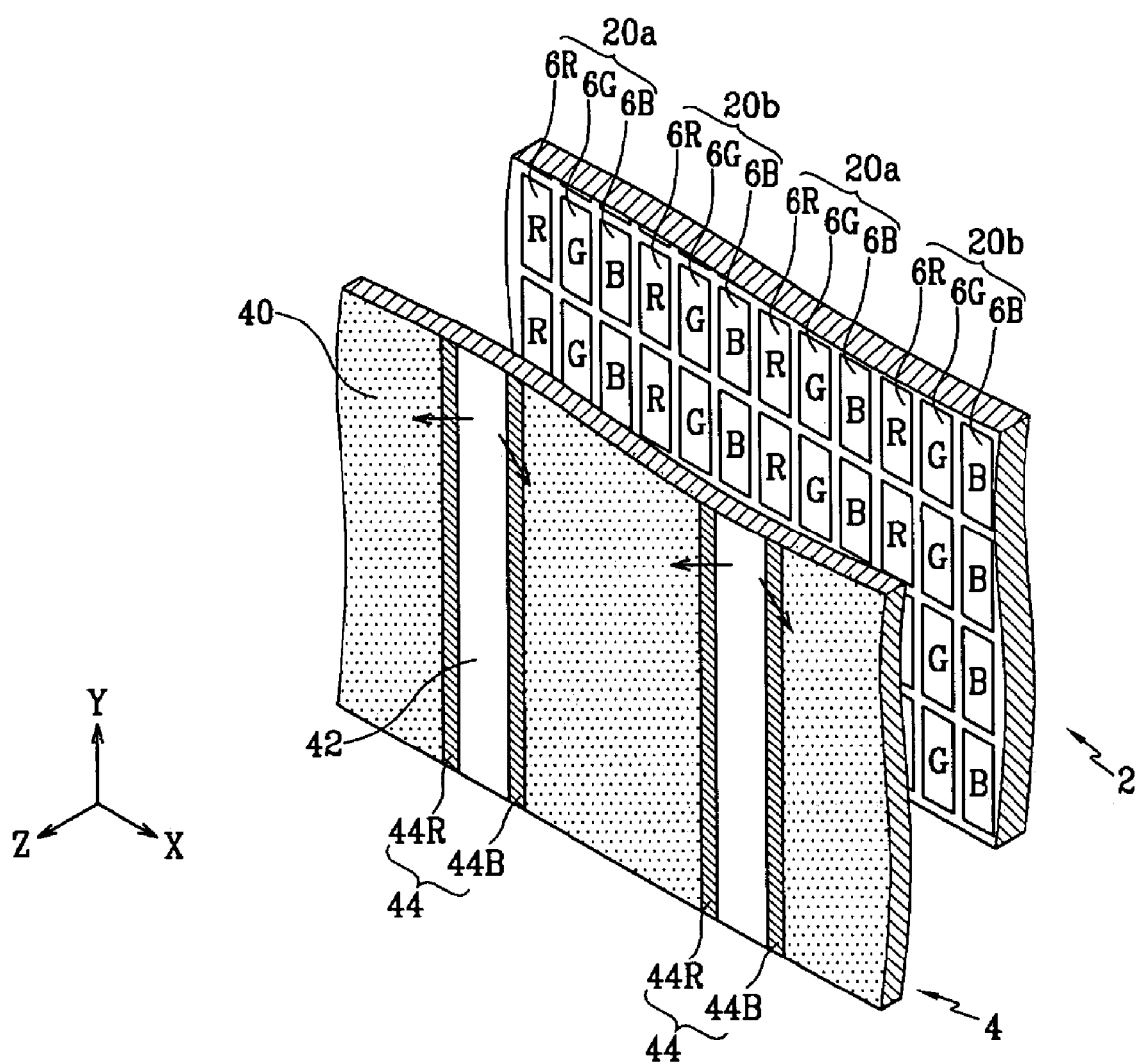
FIG. 1 is a schematic view of a three dimensional display device according to a first exemplary embodiment of the present invention.
Figure 2:
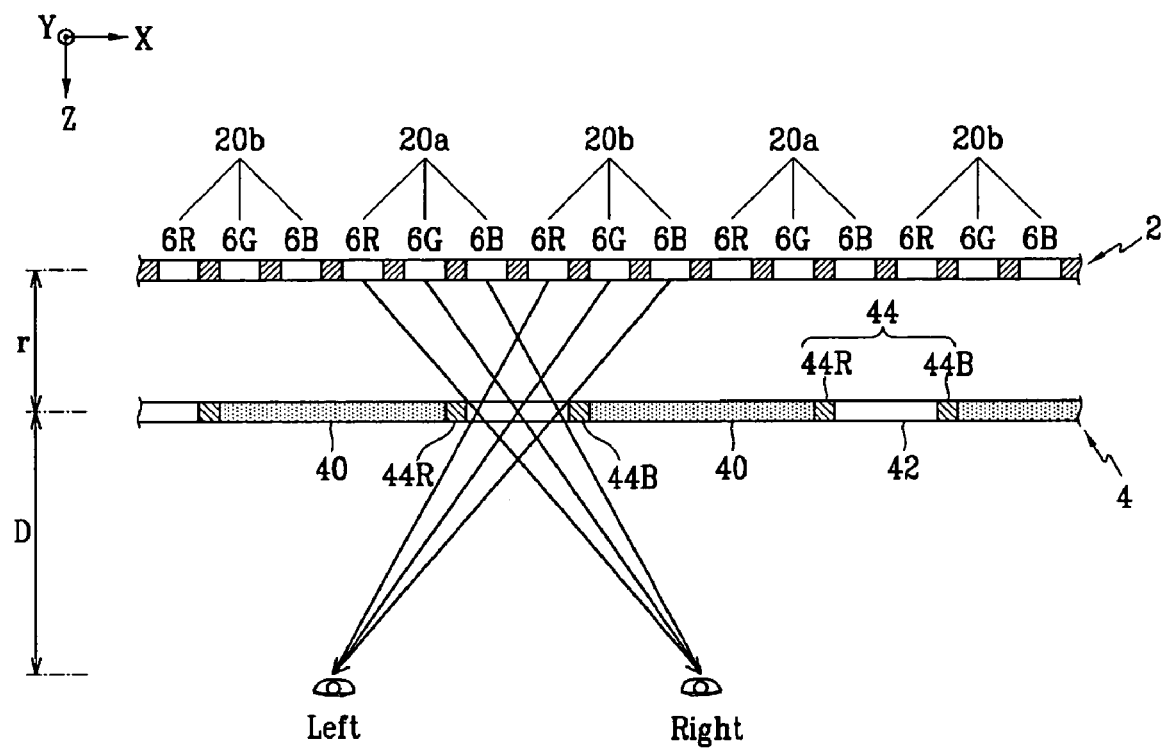
FIG. 2 is a partial sectional view of the three dimensional display device of FIG. 1.

As shown in FIGS. 1 and 2, the three dimensional display device according to a first embodiment of the present invention includes an image display unit 2 where first pixels 20a corresponding to a left-eye image part and second pixels 20b corresponding to a right-eye image part are arranged in a pattern, and a parallax barrier 4, which spatially separates the left image part and right image part, is placed at the front of the image display unit 2. It can be seen in FIG. 2 that the parallax barrier 4 is placed at a distance r from the image display unit 2 to realize a three dimensional image view distance of D.

Sets of red (R), green (G), and blue (B) sub-pixels 6R, 6G, and 6B comprising a pixel 20a or 20b are alternately and repeatedly arranged in a first direction of the image display unit 2 (i.e., in the direction of the axis X of FIG. 1), and the same-colored sub-pixels are arranged in a second direction of the image display unit 2 (in the direction of the axis Y of FIG. 1).

The image display unit 2 receives right image signals and left image signals by a unit of the pixel (i.e., per pixel) from an image signal output unit (not shown), and displays the left-eye images and right-eye images.

Right image signals and left image signals may be input alternately, repeatedly, and correspondingly to the pixels 20a and 20b arranged in the first direction of the image display unit 2.

Any suitable display device may be applied for use as the image display unit 2. For instance, the image display unit 2 may be formed with a cathode ray tube, a liquid crystal display, a plasma display panel, a field emission display device, an organic electroluminescence display device, or any other suitable display device.

The parallax barrier 4 includes stripe-shaped light interception portions 40 and light transmission portions 42 that extend in the second direction of the image display unit 2, and color filters 44.

It is to be understood that the shape of the parallax barrier 4 shown in FIGS. 1 and 2 is merely an example. The parallax barrier 4 may be formed with various modifications, e.g., to include different patterns for light interception and transmission portions.

The light transmission portions 42 are arranged such that each of them corresponds to at least two of the pixels 20a and 20b and a separate left eye image and right eye image emitted from the image display unit 2 to the left eye and right eye of the user, respectively.

FIGS. 1 and 2 show an example in which each of the light transmission portions 42 corresponds to two of the pixels 20a and 20b.

The color filters 44 are arranged between the light interception portions 40 and the light transmission portions 42. That is, the color filters 44 are arranged at both left side and right side of each light interception portion 40. When three sub-pixels of red, green, and blue are arranged with a pattern, the color filters 44 have colors corresponding to two of the sub-pixels with the exception of one of the sub-pixels arranged at the center among the three sub-pixels.

FIGS. 1 and 2 show the array of the sub-pixels 6R, 6G, and 6B in order of red sub-pixel 6R, green sub-pixel 6G, and blue sub-pixel 6B as an example. According to the array of the sub-pixels 6R, 6G, and 6B, the first color filter 44R of red is arranged at the left side of the light transmission portion 42 and the second color filter 44B of blue is arranged at the right side of the light transmission portion 42. The color filters 44R and 44B may be referred to as being formed at respective peripheral edges of one of the light transmission portions 42 to respectively transmit red and blue lights at the respective peripheral edges.

The arrangement of the color filters 44 and the array of the sub-pixels 6R, 6G, and 6B have a relationship such that the color filter 44 arranged at the left side of the light transmission portion 42 has the same color as the sub-pixel arranged at the left side among the sub-pixels sharing the light transmission portion 42, and the color filter 44 arranged at the right side of the light transmission portion 42 has the same color as the sub-pixel arranged at the right side among the sub-pixels sharing the light transmission portion 42.

The color filters 44 are provided to reduce color dispersion, and the first color filter 44R of red transmits only red light (thereby allowing only the red light to pass through) and the second color filter 44B of blue transmits only blue light (thereby allowing only the blue light to pass through).

Accordingly, on the basis of FIG. 2, the three dimensional display device according to the first exemplary embodiment has such an effect that for the light from the red sub-pixels 6R, the light interception portions 40 move it slightly to the left, and for the light from the blue sub-pixels 6B, the light interception portions 40 move it slightly to the right.

Thus, the red, green, and blue light beams from the same pixel are gathered at one point. Accordingly, the color dispersion is reduced.

In the first exemplary embodiment of the invention, the image display unit 2 is formed with a liquid crystal display device including a backlight, and the parallax barrier is formed with a liquid crystal shutter utilizing a normally white mode transmission type of liquid crystal display. Of course, the image display unit 2 and the parallax barrier 4 are not limited to the exemplary embodiments.

Since the liquid crystal display device of the first exemplary embodiment may be conventional, the parallax barrier 4 will be described more fully hereinafter.

Figure 3:
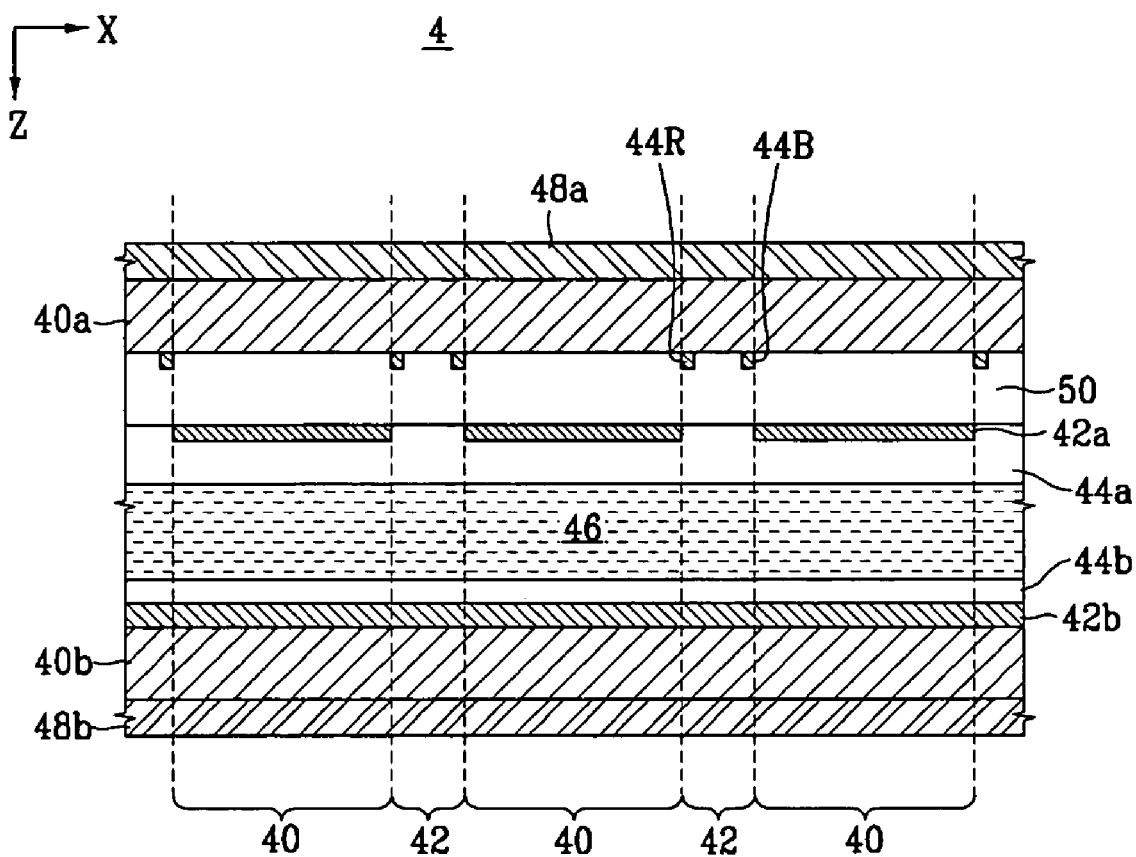
FIG. 3 is a partial sectional view of a parallax barrier in the three dimensional display device of FIG. 1.

FIG. 3 is a sectional view of the parallax barrier 4 of FIGS. 1 and 2 in detail.

As shown in FIG. 3, the parallax barrier 4 includes first and second substrates 40a and 40b facing each other, first and second electrodes 42a and 42b formed on the inner surfaces of the first and the second substrates 40a and 40b, respectively, a pair of alignment layers 44a and 44b covering the first and second electrodes 42a and 42b, a liquid crystal layer 46 disposed between the pair of alignment layers 44a and 44b, and first and second polarizing plates 48a and 48b attached to the external surfaces of the first and second substrates 40a and 40b, respectively.

Any one of the first and second electrodes 42a and 42b, such as, for example, portions of the first electrode 42a, can be formed with the same pattern as the light interception portions 40.

Accordingly, when predetermined driving voltages are applied to the first and second electrodes 42a and 42b, the alignment of the liquid crystal molecules contained in the liquid crystal layer 46 placed at the location of the first electrode 42a is varied to intercept the light, and the light at the location with no electrode is transmitted with no interception.

According to the above operation, the light interception portions 40 and the light transmission portions 42 are formed in the parallax barrier 4, and these are distinguished from each other by dotted lines in FIG. 3.

For the parallax barrier 4 formed with the liquid crystal shutter, the color filters 44 may be placed between the alignment layer 44a covering the first electrode 42a and the first substrate 40a.

In this case, the color filters 44 may be covered by an overcoat layer 50. As a matter of course, the first and the second color filters 44R and 44B are placed at the sides of the light transmission portion 42.

The first and the second color filters 44R and 44B can have a width such that they do not significantly influence brightness or resolution of the three dimensional images.

With the above operation, the parallax barrier 4 provides three dimensional images to the user. As occasion demands, the parallax barrier 4 transmits the light of the image display unit 2 in an off state where the driving voltages are not applied to the first and second electrodes 42a and 42b, the image display unit 2 displays two dimensional images. When the parallax barrier 4 is in an off state, therefore, the image display unit 2 is converted to be in a two-dimensional mode.

The three dimensional image display device according to the first exemplary embodiment of the present invention as described above was constructed, and distribution characteristics of the right-eye and the left-eye image light beams separated by the parallax barrier 4 were measured.

Figure 4A:
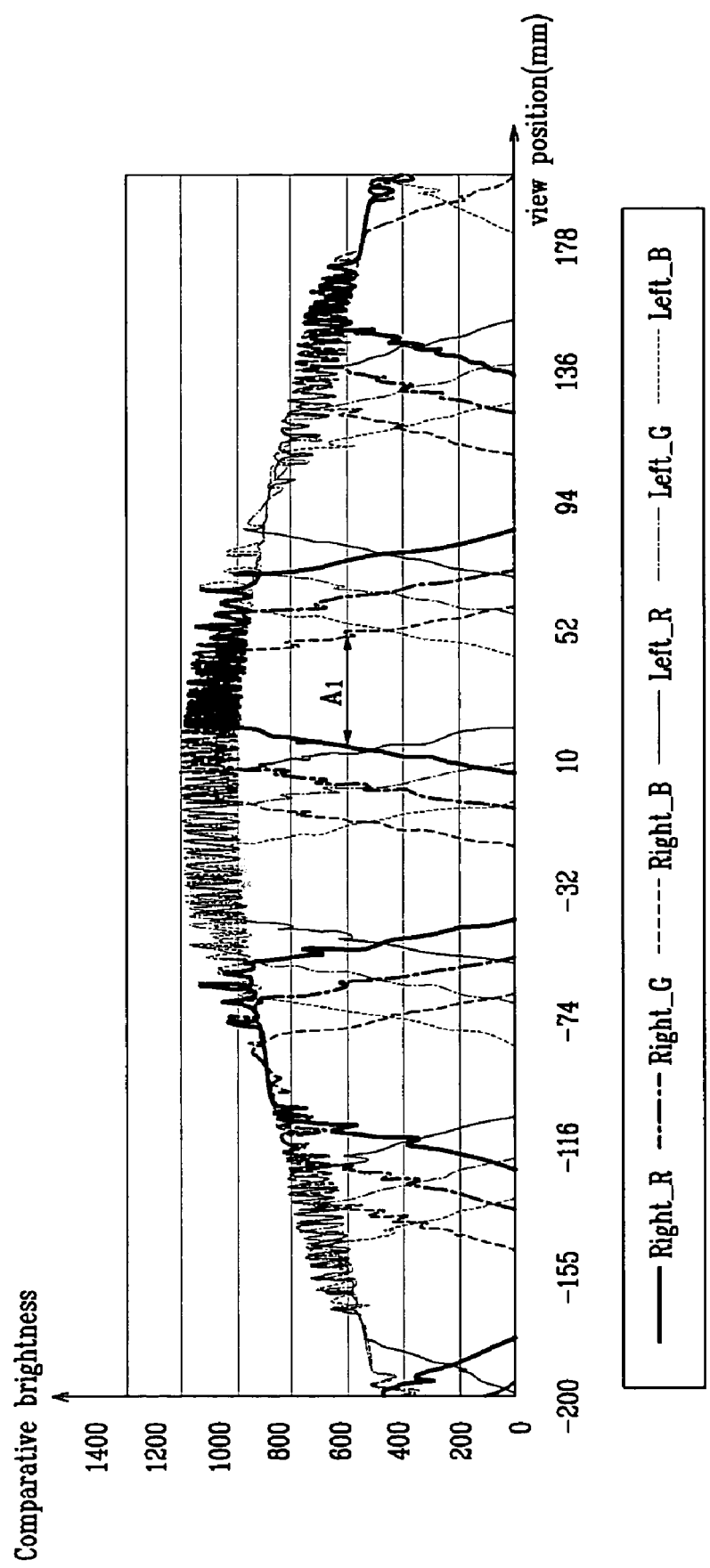
FIGS. 4A and 4B are graphs illustrating distribution characteristics of the left-eye image light beam and the right-eye image light beam with the three dimensional display device of FIG. 1.
Figure 4B:
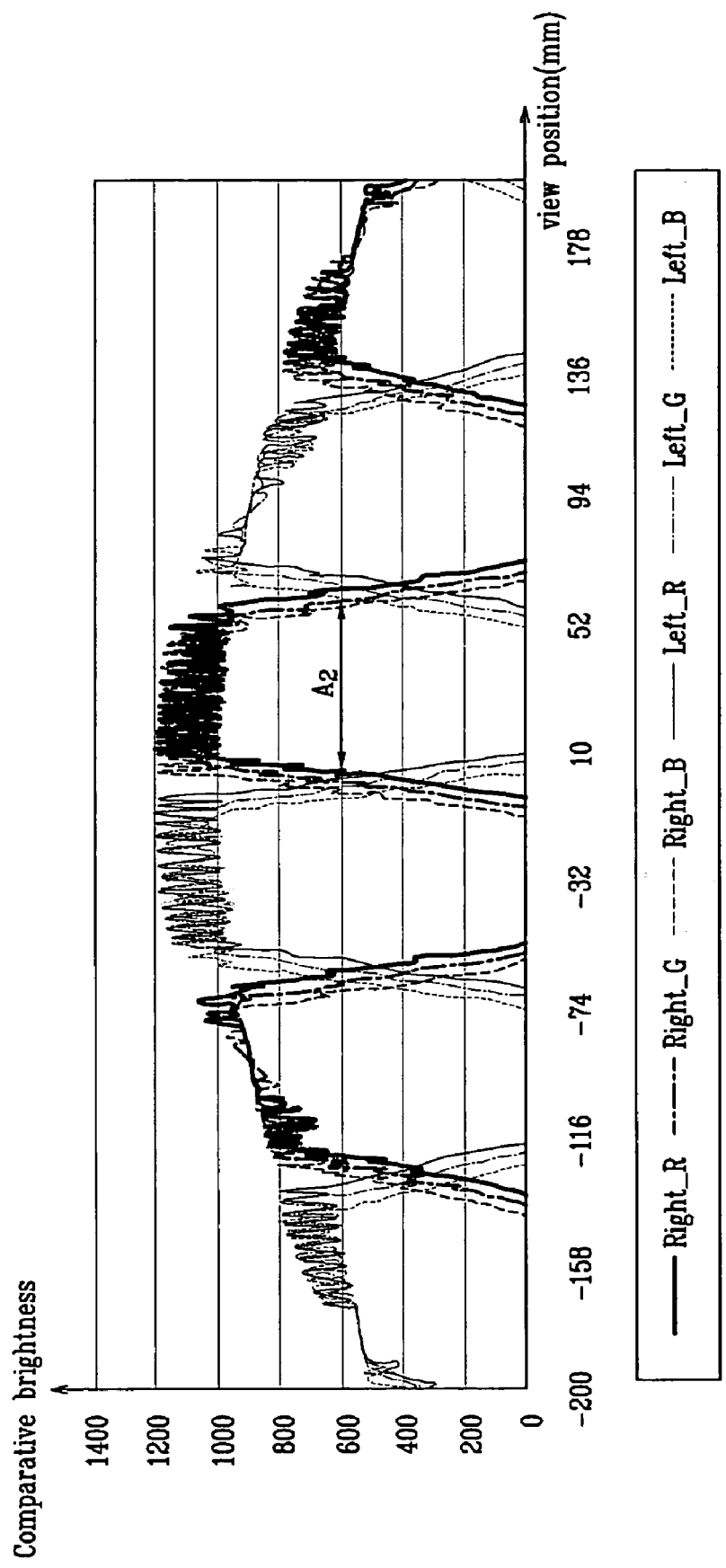

FIGS. 4A and 4B are graphs illustrating distribution characteristics of the left-eye image light beam and the right-eye image light beam with the three dimensional display device according to the first exemplary embodiment of the present invention.

FIG. 4A shows the case in which the width of the color filter (the first and the second color filters) is 20 μm, and FIG. 4B shows the case in which the width of the color filter (the first and the second color filters) is 40 μm. And FIG. 5 is a graph illustrating distribution characteristics of the left-eye image light beam and the right-eye image light beam with the three dimensional display device with no color filter, with other conditions being the same as in the first exemplary embodiment of the invention.

In each of the cases, the pitch of the transmission portions was 300 μm, and the view distance was maintained at 350 mm.

Figure 5:
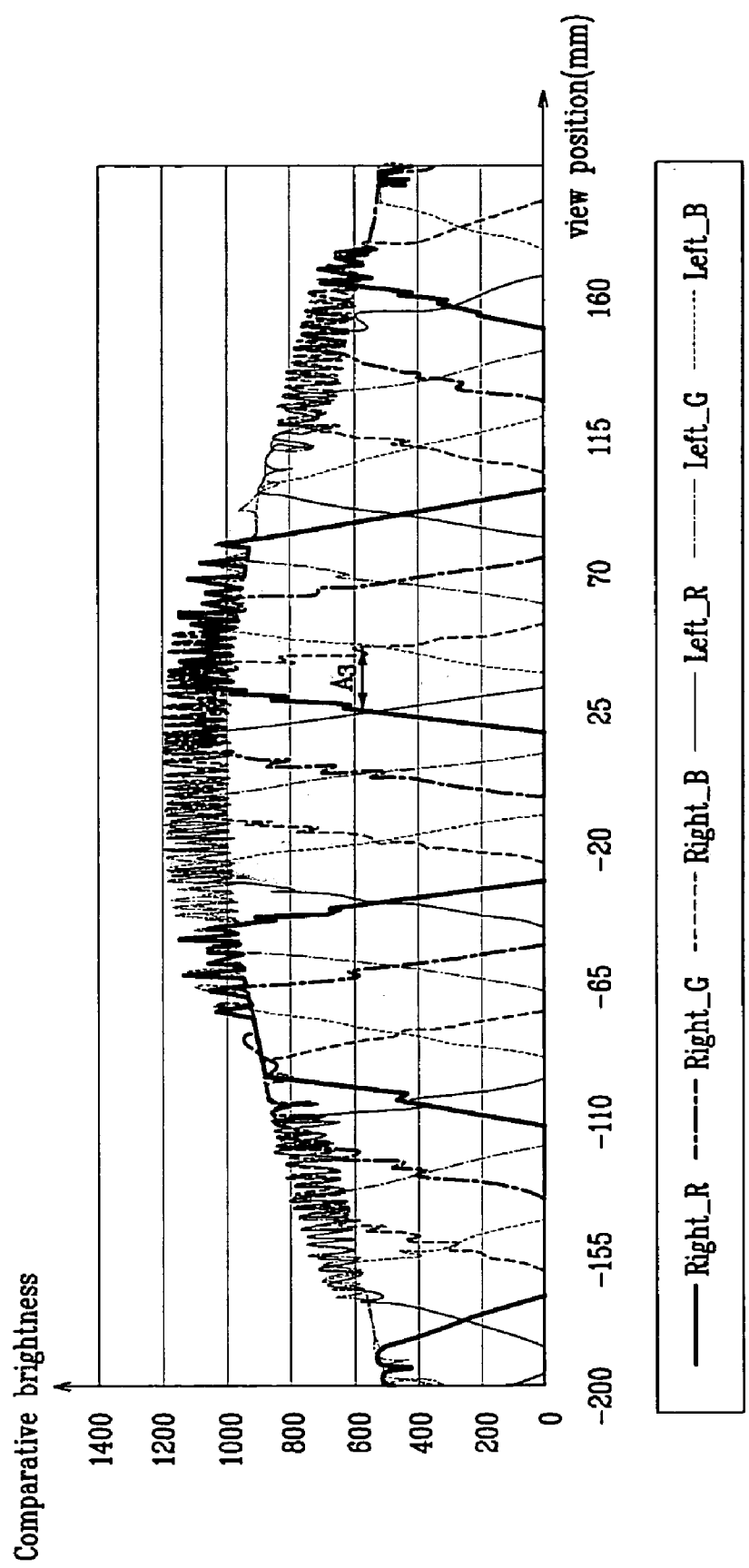
FIG. 5 is a graph illustrating a distribution characteristic of the left-eye image light beam and the right-eye image light beam with the three dimensional display device according to prior art.

As shown in the drawings, it can be seen that according to the first exemplary embodiment of the present invention (FIGS. 4A and 4B), light from sub-pixels of red, green, and blue were gathered at a certain position in comparison with that of the comparative embodiment (FIG. 5).

Accordingly, the first exemplary embodiment of the present invention can prevent the color dispersion in comparison with the comparative embodiment (FIG. 5). Thus, the user can have freedom of movement corresponding to overlapping of red and blue light (A1 and A2 in FIGS. 4A and 4B, A3 in FIG. 5).

Figure 6:
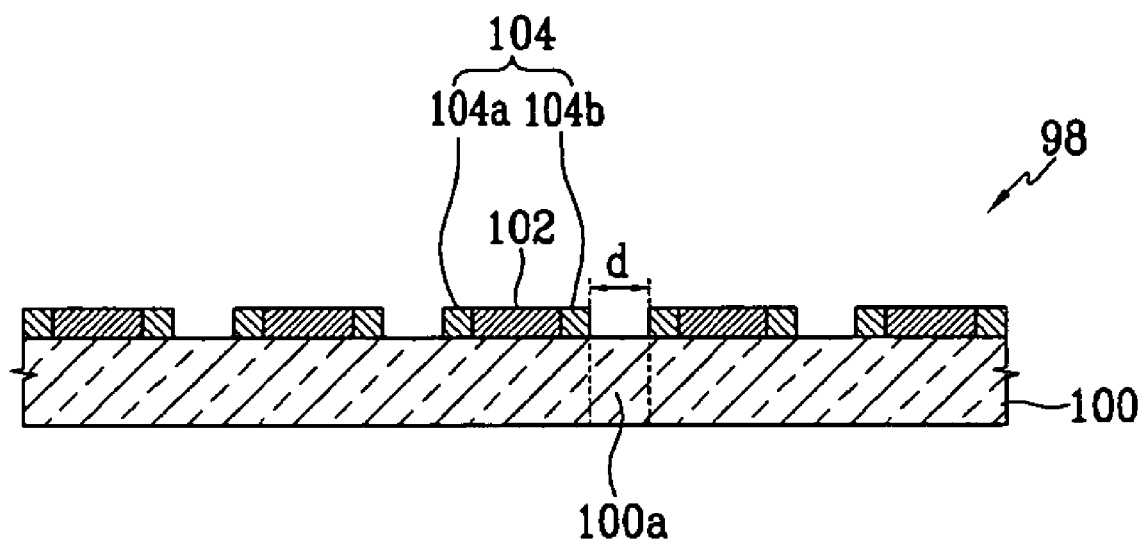
FIG. 6 is a partial sectional view of a parallax barrier according to a second exemplary embodiment of present invention.

FIG. 6 is a partial sectional view of a parallax barrier 98 according to a second exemplary embodiment of the invention. The parallax barrier 98 includes a transparent plate 100 and an opaque layer 102 placed on a surface of the transparent plate 100.

The opaque layer 102 can be formed on the transparent plate 100 having the same pattern as the light interception portion described in the first exemplary embodiment of the invention. That is, the opaque layer 102 can be formed on the transparent plate 100 in a stripe pattern having a predetermined gap 100a of d.

The first and second color filters 104a and 104b of the color filter 104 are arranged at both sides of the opaque layer 102 corresponding to the pattern of the opaque layer 102.

With the above structure, the parallax barrier 98 according to the second exemplary embodiment of the invention can operate in substantially the same manner as the parallax barrier of the first exemplary embodiment described above.

As described above, the exemplary embodiments of the present invention can separate the left eye image and the right eye image by a unit of the pixel (i.e., per pixel), so the view distance can be reduced to less than about 300 mm. Thus these embodiments are suitable for applications to small-sized devices such as cellular phones or PDAs.

In addition, the exemplary embodiments of the present invention can improve quality of three dimensional images and freedom of movement of the user by reducing or minimizing color dispersion.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three dimensional display device comprising:
    an image display unit including pixels having first sub-pixels corresponding to a left-eye image and second sub-pixels corresponding to a right-eye image; and
    a parallax barrier located proximately to the image display unit, wherein the parallax barrier comprises:
        light interception portions and light transmission portions alternately and repeatedly arranged in a direction, and
        color filters arranged between the light interception portions and the light transmission portions, wherein the color filters control paths of lights from the pixels,
    wherein the color filters include a first color filter immediately adjacent to one side of one of the light transmission portions, and a second color filter immediately adjacent to another side of the one of the light transmission portions;
    wherein each of the pixels comprises three sub-pixels, including red, green, and blue sub-pixels arranged in the direction; and
    wherein the first color filter transmits light having color corresponding to only one of the three sub-pixels, and the second color filter transmits light having color corresponding to only another one of the three sub-pixels.

2. The three dimensional display device of claim 1, wherein the light transmission portions are arranged such that each of the light transmission portions corresponds to at least two of the pixels.

3. The three dimensional display device of claim 2, wherein the first and second color filters respectively have colors corresponding to two of the three sub-pixels with an exception of one of the sub-pixels located at the center among the three sub-pixels.

4. The three dimensional display device of claim 3, wherein the sub-pixels include red, green, and blue sub-pixels arranged in the direction, and each of the first and second color filters transmits either the red light or the blue light.

5. The three dimensional display device of claim 1, wherein the parallax barrier comprises:
    first and second substrates facing each other;
    first and second electrodes located on inner surfaces of the first and second substrates; and
    a liquid crystal layer formed between the first and second substrates, wherein the first electrode is formed in the same pattern as the light interception portions, and the color filters are arranged corresponding to both sides of a portion of the first electrode.

6. The three dimensional display device of claim 5, wherein the parallax barrier further comprises:
    a pair of alignment layers covering the first and second electrodes;
    first and second polarizing plates attached to outer surfaces of the first and second substrates; and
    an overcoat layer covering the color filters.

7. The three dimensional display device of claim 6, wherein the color filters contact the first substrate at an inner surface of the first substrate, and are separated from the first electrode and the alignment layer by the overcoat layer.

8. The three dimensional display device of claim 1, wherein the parallax barrier comprises:
    a transparent plate; and
    an opaque layer arranged on a surface of the transparent layer and formed in the same pattern as the light interception portions, wherein the color filters are arranged corresponding to both sides of a portion of the opaque layer.

9. A parallax barrier for a three dimensional display device, the three dimensional display device including an image display unit having sub-pixels, for generating a display image having a left-eye image part and a right-eye image part, wherein the parallax barrier is configured to provide the display image to a user as a three dimensional image, the parallax barrier comprising:
    light interception portions and light transmission portions alternately and repeatedly arranged in a direction; and
    color filters located between the light interception portions and the light transmission portions, wherein the color filters control paths of lights from the pixels,
    wherein the color filters include a first color filter immediately adjacent to one side of one of the light transmission portions, and a second color filter immediately adjacent to another side of the one of the light transmission portions;
    wherein each of the pixels comprises three sub-pixels, including red, green, and blue sub-pixels arranged in the direction; and
    wherein the first color filter transmits light having color corresponding to only one of the three sub-pixels, and the second color filter transmits light having color corresponding to only another one of the three sub-pixels.

10. The parallax barrier of claim 9, wherein
two of the color filters adjacent to one of the light transmission portions respectively have colors corresponding to two of the three sub-pixels with an exception of one of the sub-pixels arranged at the center among the three sub-pixels.

11. The parallax barrier of claim 10, wherein the two of the color filters adjacent to the one of the light transmission portions respectively transmit red and blue lights.

12. The parallax barrier of claim 10, wherein the light interception portions, the light transmission portions and the color filters are implemented using a liquid crystal shutter comprising a liquid crystal layer, wherein a voltage is applied to the liquid crystal layer to determine the light interception portions and the light transmission portions.

13. The parallax barrier of claim 10, wherein the light interception portions and the light transmission portions are defined by an opaque layer having a stripe pattern, formed on a transparent substrate.

14. The parallax barrier of claim 13, wherein two of the color filters having different colors are formed on the transparent substrate on respective sides of the one of stripes of the opaque layer.

15. A method of providing a three dimensional image comprising:

displaying a right-eye image and a left-eye image on an image display unit having a plurality of sub-pixels, wherein the right-eye image is displayed on first said sub-pixels and the left-eye image is displayed on second said sub-pixels;

directing lights corresponding to the right-eye image toward a right eye of a user using a parallax barrier having a plurality of alternately and repeatedly arranged light interception portions and light transmission portions;

directing lights corresponding to the left-eye image toward a left eye of the user using the parallax barrier; and color filtering the lights at peripheral edges immediately adjacent to each of the light transmission portions, such that only a first color light is transmitted at one of the peripheral edges and only a second color light is transmitted at another one of the peripheral edges.

16. The method of claim 15, wherein three adjacent first said sub-pixels of the right-eye image form a right-eye pixel and three adjacent second said sub-pixels of the left-eye image form a left-eye pixel, wherein each of the light transmission portions corresponds to at least one right-eye pixel and at least one left-eye pixel.

17. The method of claim 16, wherein said color filtering comprises transmitting the lights from two of the three adjacent sub-pixels, except for a center one of the three adjacent sub-pixels, at respective peripheral edges immediately adjacent to each of the light transmission portions.

18. The method of claim 15, wherein said color filtering comprises transmitting red and blue lights only as the first and second color lights, respectively, at the peripheral edges of each of the light transmission portions.

19. A three dimensional display device comprising:
an image display unit comprising a plurality of pixels comprising first pixels corresponding to a left-eye image and second pixels corresponding to a right-eye image; and a parallax barrier located proximately to the image display unit, wherein the parallax barrier comprises:
light interception portions for intercepting all wavelengths of visible light and light transmission portions for transmitting all wavelengths of visible light, the light interception portions and the light transmission portions being alternately and repeatedly arranged in a direction; and
color filters between the light interception portions and the light transmission portions, wherein the color filters are adapted to control paths of light from the pixels for reducing color dispersion;

wherein each of the light transmission portions corresponds to at least two pixels of the plurality of pixels, the at least two pixels comprising at least one of the first pixels and at least one of the second pixels;

wherein the color filters comprise:
a first color filter located at one side of one of the light transmission portions and being in direct contact with the one of the light transmission portions and with a first one of the light interception portions; and
a second color filter located at another side opposed to the one side of the one of the light transmission portions and being in direct contact with the one of the light transmission portions and with a second one of the light interception portions;

wherein the second color filter has a different color from that of the first color filter; and wherein each of the pixels comprises three sub-pixels adapted to emit light of different colors from one another, and the first and second color filters respectively have colors corresponding to two of the three sub-pixels with an exception of one of the sub-pixels located at a central region among the three sub-pixels.

* * * * *